US008149711B2

(12) United States Patent
Schmidt et al.

(10) Patent No.: US 8,149,711 B2
(45) Date of Patent: Apr. 3, 2012

(54) DATA STREAM CONTROL FOR NETWORK DEVICES

(75) Inventors: Brian K. Schmidt, Sunnyvale, CA (US); James G. Hanko, Redwood City, CA (US); J. Duane Northcutt, Menlo Park, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 446 days.

(21) Appl. No.: 11/828,223

(22) Filed: Jul. 25, 2007

(65) Prior Publication Data

US 2009/0028047 A1 Jan. 29, 2009

(51) Int. Cl.
*H04L 12/26* (2006.01)
(52) U.S. Cl. ........................................................ 370/235
(58) Field of Classification Search ........... 370/229–235
See application file for complete search history.

(56) References Cited

U.S. PATENT DOCUMENTS

| | | | |
|---|---|---|---|
| 4,246,611 A | 1/1981 | Davies | |
| 4,689,022 A | 8/1987 | Peers et al. | |
| 5,805,821 A | 9/1998 | Saxena et al. | |
| 6,141,702 A | 10/2000 | Ludtke et al. | |
| 6,272,144 B1 | 8/2001 | Berenbaum et al. | |
| 6,631,453 B1 * | 10/2003 | Friday | 711/163 |
| 7,447,775 B1 * | 11/2008 | Zhu et al. | 709/226 |
| 2002/0083173 A1 * | 6/2002 | Musoll et al. | 709/225 |
| 2004/0221313 A1 * | 11/2004 | Depietro et al. | 725/105 |
| 2005/0007957 A1 * | 1/2005 | Ibaraki et al. | 370/235 |
| 2005/0093770 A1 | 5/2005 | de Bonet et al. | |

FOREIGN PATENT DOCUMENTS

| | | |
|---|---|---|
| EP | 0162327 | 11/1985 |
| GB | 2355902 | 5/2001 |
| WO | WO-9800974 | 1/1998 |
| WO | WO-0118643 | 3/2001 |

OTHER PUBLICATIONS

"8029P023PCT ISR and WO mailed Nov. 18, 2008 for PCT/US2008/069099", (Nov. 18, 2008), Whole Document.
Int'l Preliminary Report on Patentability mailed Feb. 4, 2010 for Int'l Application No. PCT/US2008/069099.
Office Action for European Patent Application No. 08772394.6, mailed Jan. 18, 2011.

* cited by examiner

*Primary Examiner* — Derrick Ferris
*Assistant Examiner* — Mang Yeung
(74) *Attorney, Agent, or Firm* — Blakely, Sokoloff, Taylor, Zafman

(57) ABSTRACT

A method and apparatus for data stream control for network devices. Some embodiments of an apparatus include a receiver to receive a token for a command associated with a stream of data, where the command is one of multiple command types. The token has a fixed size and format, and the token is provided in a field of a data packet. The apparatus further includes a network unit to determine the type of command based on the token, to parse a set of fields in the data packet for command data, and implement the command.

20 Claims, 9 Drawing Sheets

DATA STREAM CONTROL FOR NETWORK DEVICES

TECHNICAL FIELD

Embodiments of the invention generally relate to the field of networks and, more particularly, to a method and apparatus for data stream control for network devices.

BACKGROUND

As personal electronic entertainment choices increase, there is more incentive to connect the various media devices together in a network in order to share data, increase convenience, and make fuller use of each element. For example, certain devices within a home may be connected together. In such an environment, there are multiple potential sources and users of streaming digital media content for audio, video, gaming, and other uses.

In an entertainment network, data in the form of media streams may be transferred between the network devices. The media streams may be controlled within the network using a conventional technology. A variety of protocols exist to control the delivery of media streams. Examples of such technologies include RTSP (Real-Time Streaming Protocol) and DLNA (Digital Living Network Alliance). These and similar protocols are generally based on HTTP (Hypertext Transfer Protocol), XML (Extensible Markup Language) schemas, or other text-based protocols.

However, conventional protocols may be too heavyweight for low-resource devices, particularly those that do not have sufficient buffering or processing capabilities to process variable-length strings or to manage open connections to several other devices. If devices in an entertainment network are implemented with limited resources, the conventional protocols may be difficult to implement practically in the network.

SUMMARY OF THE INVENTION

A method and apparatus are provided for data stream control for network devices.

In a first aspect of the invention, an apparatus may include receiver to receive a token for a command associated with a stream of data, where the command is one of multiple command types. The token has a fixed size and format, and the token is provided in a field of a data packet. The apparatus further includes a network unit to determine the type of command based on the token, to parse a set of fields in the data packet for command data, and implement the command.

In a second aspect of the invention, an apparatus may include a network unit to generate a token for a command associated with a stream of data, the command being one of multiple commands. The token has a fixed size and format and is provided in a field of a data packet, with the data packet having zero or more fields for command data. The apparatus may further include a transmitter to transmit the data packet.

In a third aspect of the invention, a network includes a first network device, where the first network device generates a token for a command a data stream. The token is contained in a field of a data packet and represents one of multiple command types, with the field having a fixed size and format that is used for each of the plurality of command types. The network includes a second network device, where the second network device is to receive the token for the command, decode the token to determine the command type, and implement the command for a data stream.

In a fourth aspect of the invention, a method for controlling streaming of data may include generating a command to control a data stream in a network, with the command including a token to represent one of multiple command types, and the token having a fixed size and format. The command is transmitted. The method further includes decoding the command, which includes determining the type of command based on the token.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to data stream control for network devices.

As used herein, "entertainment network" means an interconnection network to deliver digital media content (including music, audio/video, gaming, photos, and others) between devices. An entertainment network may include a personal entertainment network, such as a network in a household, an entertainment network in a business setting, or any other network of entertainment devices. In such a network, certain network devices may be the source of media content, such as a digital television tuner, cable set-top box, video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions. In some embodiments, the network devices may be co-located on a single local area network. In other embodiments, the network devices may span multiple network segments, such as through tunneling between local area networks. The entertainment network may include multiple data encoding and encryption processes.

In some embodiments, data stream control commands in a network are carried in fixed-size, fixed format messages. In some embodiments, a stream control command includes a token containing a numerical value, such as an integer, to represent one of a set of possible stream control commands. In some embodiments, the stream control commands are transferred and received by low resource network devices with limited processing or buffering capabilities.

Figure 1:
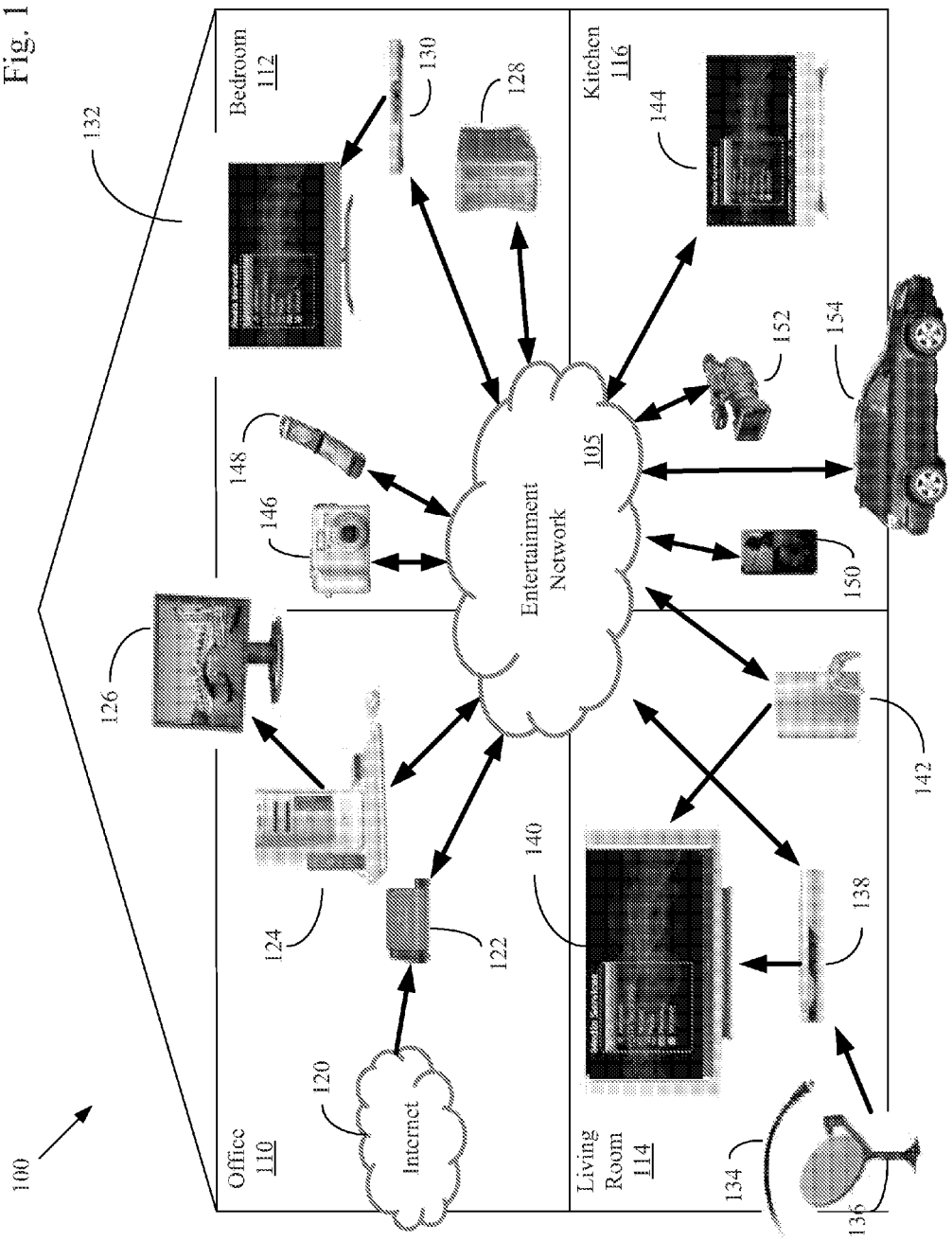
FIG. 1 is an illustration of embodiments of an entertainment network.

Conventional stream control protocols are generally carried as reliable byte streams with variable length messages. However, the conventional protocols provide difficulties in networks utilizing low resource network devices, such as in an entertainment network in which processing or buffering capabilities are limited. Low resource devices may include, but are not limited to, system on a chip (SoC) solutions, embedded processor systems, handheld computing devices or other handheld devices, and other devices or systems in which processing capability or memory capacity is limited. In some embodiments, low resource devices may include media and entertainment devices, including such devices as are illustrated in FIG. 1 and described below.

In some embodiments, media stream control is implemented utilizing small, fixed-size messages to carry the stream control commands. In some embodiments, the use of such messages causes the buffering requirements at the receiver to be deterministic, thereby simplifying buffer management and reducing strain on limited resources. In addition, the use of fixed messages may provide for reducing logic complexity in media stream control because, for example, there is no need for partial decoding when an entire message exceeds capacity and thus may be ignored. In some embodiments, a fixed message size may be 64 bytes, but this is only an example, and smaller or larger sizes are possible in different embodiments.

In some embodiments, a protocol for data stream control is then utilized in a networking protocol. In some embodiments, the underlying protocol to carry data stream control messages may be any standard networking protocol, including, but not limited to, UDP/IP (User Datagram Protocol/Internet Protocol) or TCP/IP (Transmission Control Protocol/Internet Protocol). In some embodiments, a protocol for stream control may be a portion, or sub-protocol, of an entertainment protocol for the use of network devices and agents in communicating over an entertainment network.

In some embodiments, data stream control in a network utilizes a token-based message format. In some embodiments, a command may include a field with established location and size to contain a numerical value, with the numerical value representing a token for the particular command type that is contained in a message. In some embodiments, each stream control command and associated parameter is assigned a numerical token of a fixed size and format. In some embodiments, each possible value of the field may represent a particular command type or parameter, with any unassigned values being undefined commands that are ignored. In contrast, in a conventional process, the commands for stream control would generally be delivered as text strings by known schemes. The use of tokens for stream control parameters may allow for fixed sized messaging and reduction in processing for network devices with limited resources.

In some embodiments, stream control may include, but is not limited to, commands related to:
 (a) Setting up a stream between a source and one or more destinations;
 (b) Playing a stream;
 (c) Pausing a stream;
 (d) Tearing down the resources assigned to a stream; and
 (e) Getting and setting stream parameters, which may include play speed, play position, and other stream modifications.

In one example, a stream control command may be formatted as a single byte (8 bits), where each of the 256 values of the byte indicates a different command. Further, a destination parameter for a setup command may include a four-byte IP address in network byte order and a two-byte port number in network byte order. In such example, a speed of play parameter may be encoded as a four-byte fixed-point value in network byte order. Other parameters and fields may also be implemented in fixed-byte increments. A message that includes such fields may thus have a fixed length for processing by low resource devices. In some embodiments, a packet filtering style design can vector messages to appropriate message handlers based on various fields of the message body. While a text-based protocol, such as in a conventional system, may be easily readable by humans, the resulting implementation is process and memory intensive. In addition, an interpreter can translate between the fixed-format tokens and a text string for readability by human operators in operations such as debugging In some embodiments, message handlers may be implemented as hardware state machines. The use of hardware state machines may allow simplified system design of network devices. However, embodiments may be implemented as hardware, software, or a combination of hardware and software.

A further constraint for low-resource environments is that the state necessary to maintain an open network connection may be quite large. In some embodiments, operations allow for reducing the number of open connections that need to be maintained. In some embodiments, the format of fixed-size messages that are used to carry stream control protocol may include fields to identify a message type and a destination. Stream control may be one message type, but many message types are possible. In some embodiments, a hardware state machine is configured to vector messages of a particular type to a particular message handler. This enables messages from different protocols to be multiplexed onto the same connection, thereby reducing the number of open connections required.

In some embodiments, a target field of a message may also be used for sharing of connections. For example, multiple clients of the stream control protocol may share a single connection, with a hardware state machine automatically vectoring messages to the appropriate client.

In some embodiments, the ability to share connections may be utilized to reduce the number of states a network device must maintain in operation without impacting the performance of the network device. In some embodiments, benefits to a receiver provided by fixed size, fixed format stream control messaging also are relevant to a transmitter. For a transmitter, fewer resources may be needed to generate fixed-size, fixed-format messages, and a hardware state machine may again be implemented.

FIG. 1 is an illustration of embodiments of an entertainment network. In this illustration, the entertainment network system 100 provides for the connection of any compatible media device to the network. The connection is shown as a connection to entertainment network 105. In some embodiments, the devices operate as network without a central network server. Through the entertainment network, media data streams may be transferred between any of the connected devices. In addition, devices may be controlled remotely through the network. The devices may be connected to the network via any known connector and connection protocol, including coaxial cables, Ethernet cables, and Firewire, and wireless connections via Wi-Fi, Bluetooth, and other wireless technologies.

In some embodiments, the devices may include any media sources or recipients. In FIG. 1, an office 110 may provide an Internet connection 120 via a gateway 122 to the network 105. The data received from the Internet may include any streaming media sources, including, but not limited to, purchased audio files (such as downloaded music files), video files (such as movies, television, and other), and computer games. The office 110 may also be connected to a personal computer 124 that utilizes a monitor 126, which may, among other functions, display certain media streams or operate certain computer games.

The entertainment network may also be connected with devices in a bedroom 112, which may, for example, contain a set top box 130 to provide data to a television 132. In addition, the bedroom (or any other space) may contain a media storage unit 128. The media storage unit 128 may receive data from any source connected to the network 105, and may provide to any data recipient connected to the network 105. The media storage unit 128 may contain any type of media stream data for the network.

The system may further include a living room 114 receiving, for example, input from a cable or fiber system 134 or from a satellite dish network 136. The media input from such sources may be provided to a set top box 138 connected to the network 105 and to a second television 140. Also connected to the network 105 for display on the living room television 140 may be a video game unit 142. There may be any number of other rooms with networked devices, such as a kitchen containing a third television 144 connected to the network 105. Other network devices may also be present, including, but not limited to, a stereo audio system that may include speakers placed throughout the house.

In addition, any number of mobile personal electronic devices may connect to the network. The devices may connect via a cable or via a wireless signal, including, but not limited to, Bluetooth, Wi-Fi, infrared or other similar wireless communication protocol. Each such protocol may require an interface to the network (which are not shown in FIG. 1), such as a Wi-Fi base station. Such mobile personal electronic devices could include a digital camera 146, a cellular telephone 148, a personal music device 150, or a video camera 152. In addition, a mobile system contained in an automobile 154 may connect to the network 105 when the automobile is in close proximity to the network (such as when present in a garage of the house). The mobile personal electronic devices may, for example, automatically connect to the network when within range of the network. While connected, the devices may be available to obtain data through the network or to provide data to the network, including possible automatic updates or downloads to the devices. In one example, a user may be able to access the data contained in any of the mobile electronic devices through the network, such as accessing the photographs stored on the digital camera 146 on the living room television 140 via the set top box 138.

In some embodiments, the network devices illustrated in FIG. 1 are low resource devices that have been designed with limited network processing and buffering capabilities. In some embodiments, media control commands are exchanged between the illustrated devices in data packets, with each data packet being of a fixed size, and with the individual commands being identified by tokens.

Figure 2:
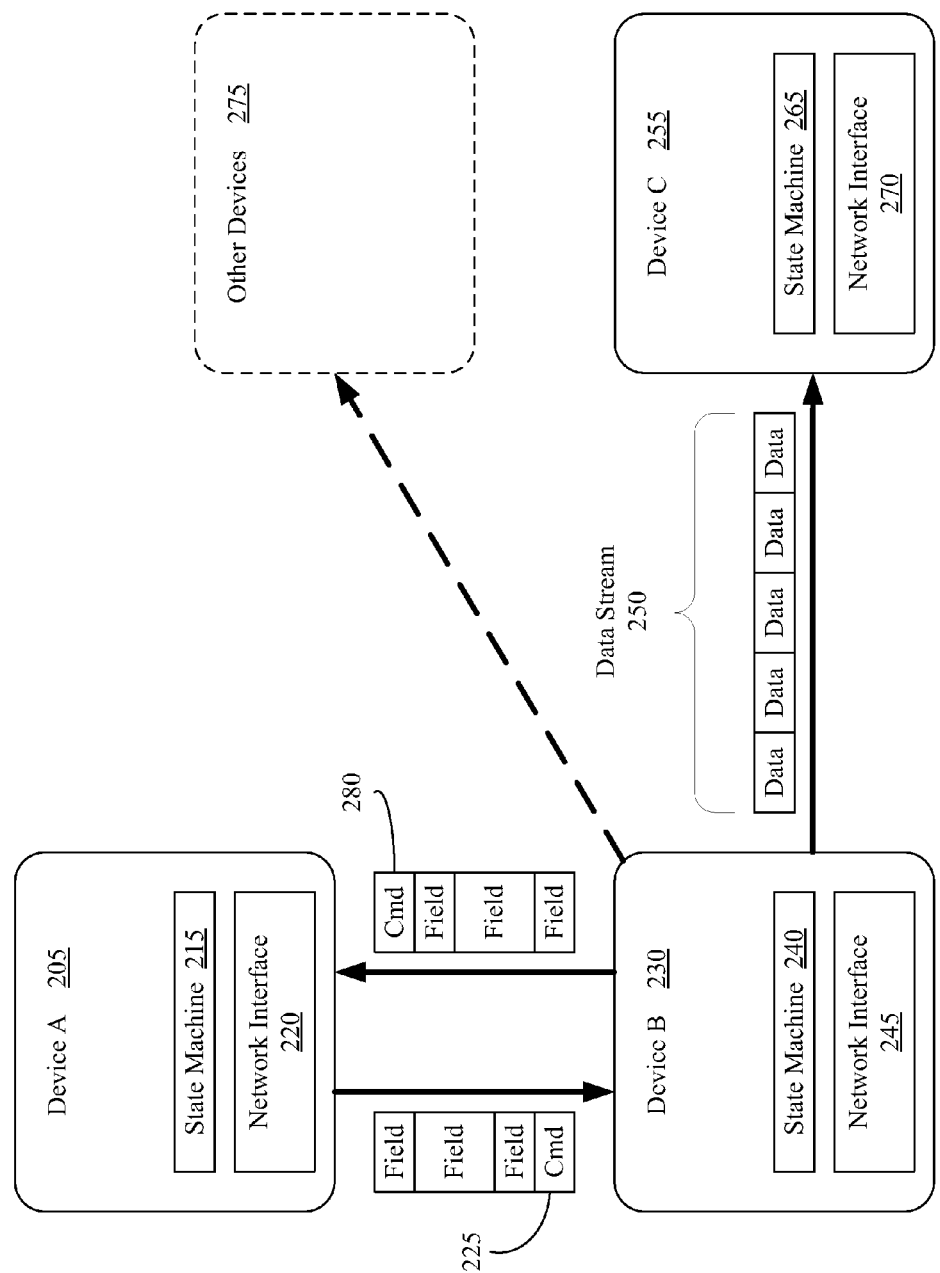
FIG. 2 is an illustration of embodiments of a system to provide for exchanges of data control commands.

FIG. 2 is an illustration of embodiments of a system to provide for exchanges of stream control commands. In this illustration, device A 205, device B 230, device C 255, and other devices 275 are connected in an entertainment network. In some embodiments, each device includes a network interface to provide for communications on the network. For example, device A 205 includes network interface 220, device B 230 includes network interface 245, and device C 255 includes network interface 265.

In some embodiments, device A 205 may be configured to transfer a data packet 225 containing a media control command to device B 230. In some embodiments, the data packet 225 is of a fixed size for any of multiple different media control commands, with the command contained in a data packet being identified by a token value in a predefined field of the data packet. The data packet 225 may also include zero or more fields for data relating to the command. The fields may be of varying size, with the fields being dependent on the type of media control command contained in the data packet 225. The use of the token based command structure may allow for simplified processing, such as in the use of a state machine for command operations. In some embodiments, each network device will include a state machine for media command processing, as illustrated by state machine 215 for device A 205, state machine 240 for device B 230, and state machine 265 for device C 255.

In an example, a media control command is transferred via the data packet 225 to device B 230 to affect a media data stream. The media data stream may be delivered to any network device, including a return of the data to the requesting device, device A 205. In this particular example, the media data stream 250 is directed to device C 255, and may also be directed to one or more other devices 275. The command may be related to any aspect of the lifespan of the media data stream, including, but not limited to, the set up of the data stream, the operation of the data stream, the teardown of the data stream, an inquiry regarding the data stream, or other aspect of the media stream.

In some embodiments, a media stream command will be a request that will result in a response from the recipient. In FIG. 2 this is illustrated as data packet 280 from device B 230 to device A 205, which may contain a response to a request that was contained in data packet 225 sent from device A 205 to device B 230.

Figure 3:
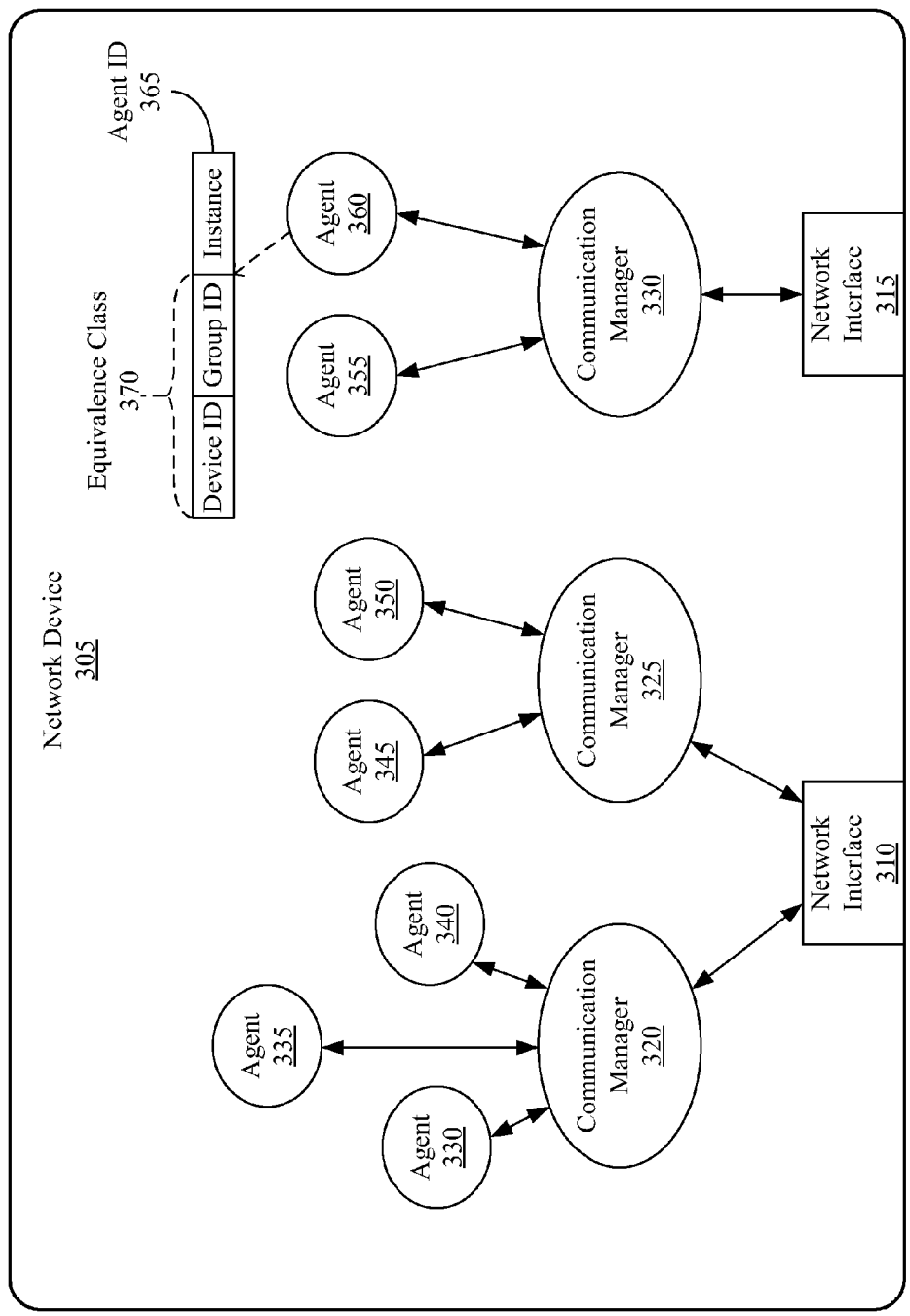
FIG. 3 is an illustration of embodiments of a network device.

FIG. 3 is an illustration of embodiments of a network device. In some embodiments, a network device 305 is an entity with at least one physical network interface, such as an Ethernet MAC address. As illustrated in FIG. 3, the network device includes two network interfaces 310 and 315. In some embodiments, network device thus is a physical entity. In some embodiments, the network device includes one or more agents, with each agent being a logical entity that resides on a network device. There may be multiple agents on a network device. For example, FIG. 3 illustrates a network device 305, with network interface 310 providing access to agents 330, 335, and 340 via communication manager 320 and agents 345 and 350 via communication manager 325, and providing access to agents 355 and 360 via communication manager 330. In some embodiments, each agent is assigned a globally unique identifier to distinguish it from other agents, independent of the network device IP address and across device reset operations. In this manner, a command that is intended for agent 355 may be addressed to the unique address for the agent, and the message will then be directed through network interface 315 to agent 355.

In some embodiments, agents serve as endpoints of communication within a network device, and provide a particular set of capabilities and associated behaviors. Agents may include media data sources, media data storage device, media data controllers, and other elements. In one example, an agent may provide a video streaming service. In this example, the agent responds to messages to query and control media streams, and, when instructed, the agent may autonomously deliver a media stream to another agent. In some embodiments, an agent has no more than one active media session at any time, thus providing for relatively simple operation. An agent may be viewed as acting as an active object in that the agent may send and receive messages, modify internal state in response to such messages, and have the ability to perform continuous actions as a side effect.

In some embodiments, one or more agents are members of an equivalence class. Members of an equivalence class have identical or equivalent behavior, and may be represented to a user as a single agent. In one example, a pool of tuner agents for tuning television signals may be members of an equivalence class, and such agents may be presented to the user as, for example, "Live TV". In some embodiments, an agent ID, such as agent ID 365 for agent 360, may include a device ID, a group ID, and an instance. In this form, members of an equivalence class 370 are represented by the device ID and group ID of the agent ID.

In some embodiments, an agent may communicate on an entertainment network by way of a communication manager. In some embodiments, there may be one or more communication managers per device, such as communication managers 320, 325, and 330 in FIG. 3. In some embodiments, multiple agents may be managed by a single communication manager, such as, for example, agents 330, 335, and 340 being managed by communication manager 320. In some embodiments, a communication manager is responsible for routing messages to and from the agents that are bound to the communication manager. The process may include delivering messages to other agents that are local to the same network device, multiplexing messages from individual agents onto outgoing connections to agents on remote network devices, and handling broadcast requests. In some embodiments, an agent may be bound to only one communication manager, and a communication manager may be bound to only one network interface.

In some embodiments, a display manager is an agent that manages the resources on a display device. Specifically, the display manager is responsible for granting access to the display resources and screen geometry. In some embodiments, each display device has only one display manager for each related set of I/O devices, such as video output, graphics output, audio output, and user input. In some embodiments, the agent works with a session manager to coordinate the delivery and display of media content at the display device, granting access to the display device resources. In some embodiments, a display manager represents the starting point for a user session and delegate controls to a session manager.

In some embodiments, a session manager is an agent that coordinates a set of media content for an active user. In some embodiments, once selected, a session manager initiates a remote on-screen display session with the corresponding display manager and begins to execute an application program to manage other devices in the network. In some embodiments, a display manager forwards input events to the session manager and grants access rights to its display resources, which a session manager can delegate to other agents, thus allowing the other agents to deliver content to the display. In one example, a display manager may grant access rights to a session manager that executes within a set-top box. The session manager may initiate a remote UI (user interface) session with the display, and allows the user of the network device to select a video to be played from a remote video storage device. In some embodiments, the session manager may pass access rights to a video server, and direct the video server to deliver a media stream to the display. In some embodiments, session managers maintain the states necessary to manage a user's experience in utilizing media content.

Figure 4:
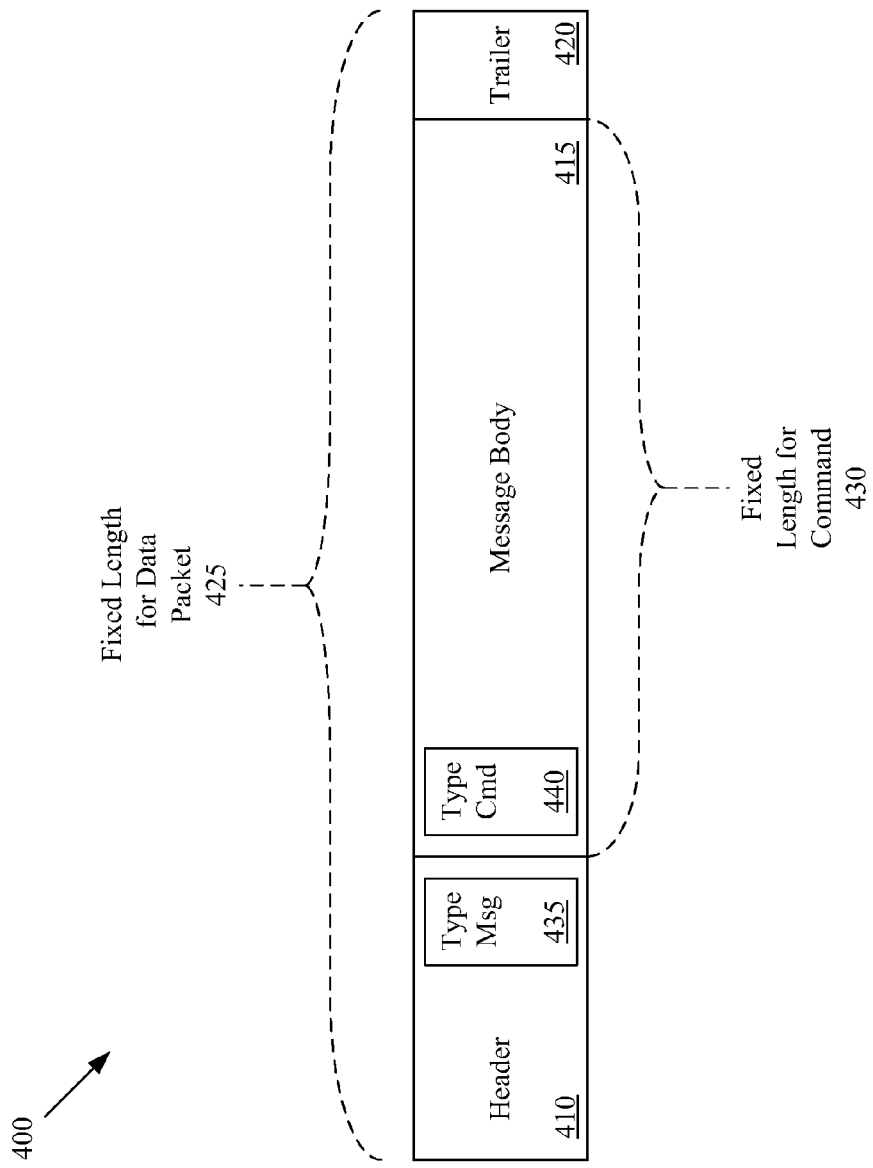
FIG. 4 is an illustration of embodiments of a data packet for a media control command.

FIG. 4 is an illustration of embodiments of a data packet for a media control command. In some embodiments, the data packet 400 may include a header 410, a message body 415, and a trailer 420. In some embodiments, the data packet 400 has a fixed length 425 for any type of message. In one example, the fixed length is 64 bytes, but any smaller or larger length may be used. The header may include a message type field 435 to indicate the type of message contained in the message body 415. In some embodiments, the message type field 435 is a fixed length and contains a numerical token to indicate the type of message, with each possible token value indicating a type of message or an undefined message. In some embodiments, the types of message that may be contained in the message body include a media control command.

In some embodiments, the message body 415 may be a fixed length for a media control command 430. In some embodiments, the message body 415 may include a command type field 440 to indicate the type of command that is contained in the message body 415. In some embodiments, the message type field 435 is a fixed length and contains a numerical token to indicate the type of command, with each possible token value indicating a type of command or an undefined command.

Figure 5:
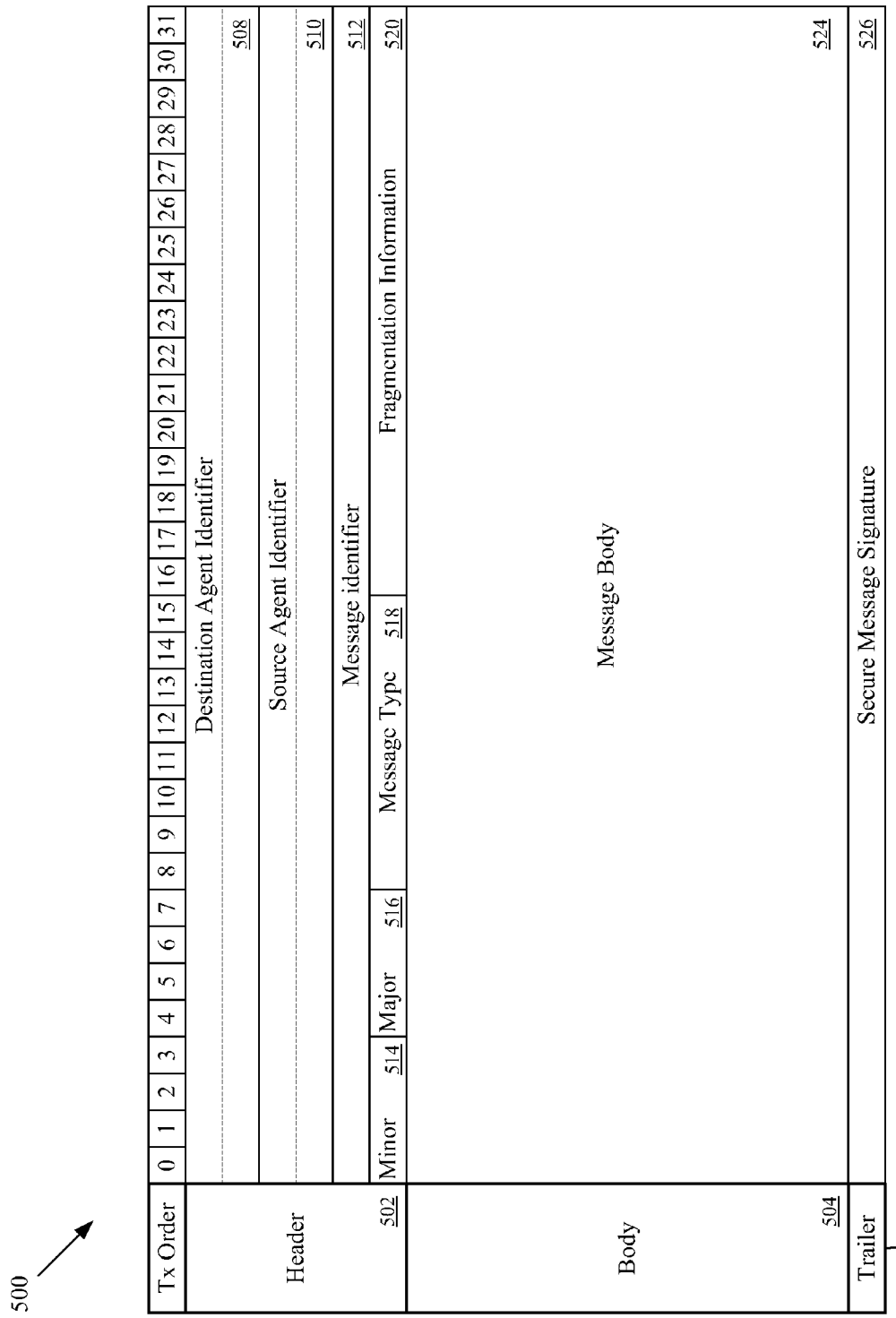
FIG. 5 is an illustration of embodiments of a data packet transferred in an entertainment network.

FIG. 5 is an illustration of embodiments of a data packet transferred in an entertainment network. In some embodiments, the data packet 500 is 64 bytes long, but any size may be utilized in a network. In some embodiments, the data packet may include a header 502, a body 504, and a trailer 506. In some embodiments, the header 502 includes a destination agent identifier 508, which, in one example, may be a 64-bit field. In some embodiments, the field is transmitted in network byte order and identifies the agent to which the message should be delivered. In some embodiments, a particular value (such as hex value 0xFFFFFFFFFFFFFFFF, as one possible example) may indicate that the message should be delivered to all available agents as a broadcast. In some embodiments, the value zero may indicate an invalid or unspecified agent, and messages with a destination identifier field set to zero are ignored by receiving agents.

In some embodiments, the header 502 further includes a source agent identifier field 510, which is again shown, as one example, as a 64-bit field. In some embodiments the source agent identifier field 510 is transmitted in network byte order and identifies the agent from which a message originated. If the source is unknown, the value may be set to zero. In some embodiments, a particular value (such as hex value 0xFFFFFFFFFFFFFFFF, as one possible example) is reserved and invalid as a source identifier, and messages with this value in the source field are ignored by receiving agents.

In some embodiments, the header includes a message identifier field 512, shown for example in FIG. 5 as a 32-bit field. In some embodiments, the message identifier field is transmitted in network byte order and represents an application-specific value that is used as a cookie to identify individual messages. This value can be used by agents to reject unexpected messages. In one example, a request message may include a particular message identifier, and the response then is required to include the same identifier, which allows the requester to reject stale or duplicate responses.

In some embodiments, a version field may indicate the current version of the network protocol to distinguish between different versions. In one example, bits 0 through 3 form a version minor number 514, and bits 4 through 7 form a version major number 516. For example, for version 1.0 the current major number is 1, and the current minor number is 0.

In some embodiments, the header 502 may include a message type field 518, which is illustrated as an 8-bit field, but any number of bits may be used. In some embodiments, the field indicates the type of message contained in the body 504. In an embodiment, the network protocol is a container protocol that allows a variety of domain-specific protocols to be encapsulated within it. In some embodiments, the message field 518 distinguishes among the protocols. In an example, if an agent receives a message with an unrecognized message type value, the agent will ignore the message and send no response to the message. In some embodiments, the protocols may include a protocol to provide for media control commands (a media source protocol), such protocol providing for control of the transmission of media content (audio, video, image, graphics, and any other media) from a source agent.

In some embodiments the header may include a fragmentation information field 520, which is illustrated in FIG. 5 as, for example, a 16-bit field. In some embodiments the field is intended to provide information regarding the fragmentation of message. In some embodiments, the field is transmitted in network byte order and is used to support exchanges that span multiple messages. In an example, bit 0 of the field may serve as an indicator as to whether the message is the final part of an exchange, i.e. a value of 1 indicates the message is the last fragment, and a value of 0 indicates that more fragments will follow. In this example, bits 1 through 15 then may indicate the total number of fragments in the exchange, where the value 0 may be reserved to indicate that the number of fragments is unspecified, and thus when the final fragment indicator must be monitored. The fragmentation information field may be utilized to aid a receiver in its memory management.

In some embodiments, the body 504 of the data packet 500 contains the payload of the message. In the illustrated example, the message body 524 is a 36-byte field, but any size may be used. In some embodiments the format of the message body 524 is dependent upon the message type 518.

In some embodiments, the data packet 506 may be followed by a trailer 506. In some embodiments, the trailer 506 may contain a secure message signature 526 to provide security in network data transmission. However, other security mechanisms may be instituted for the transmission of data in the network, and the trailer 506 may include other information.

Figure 6:
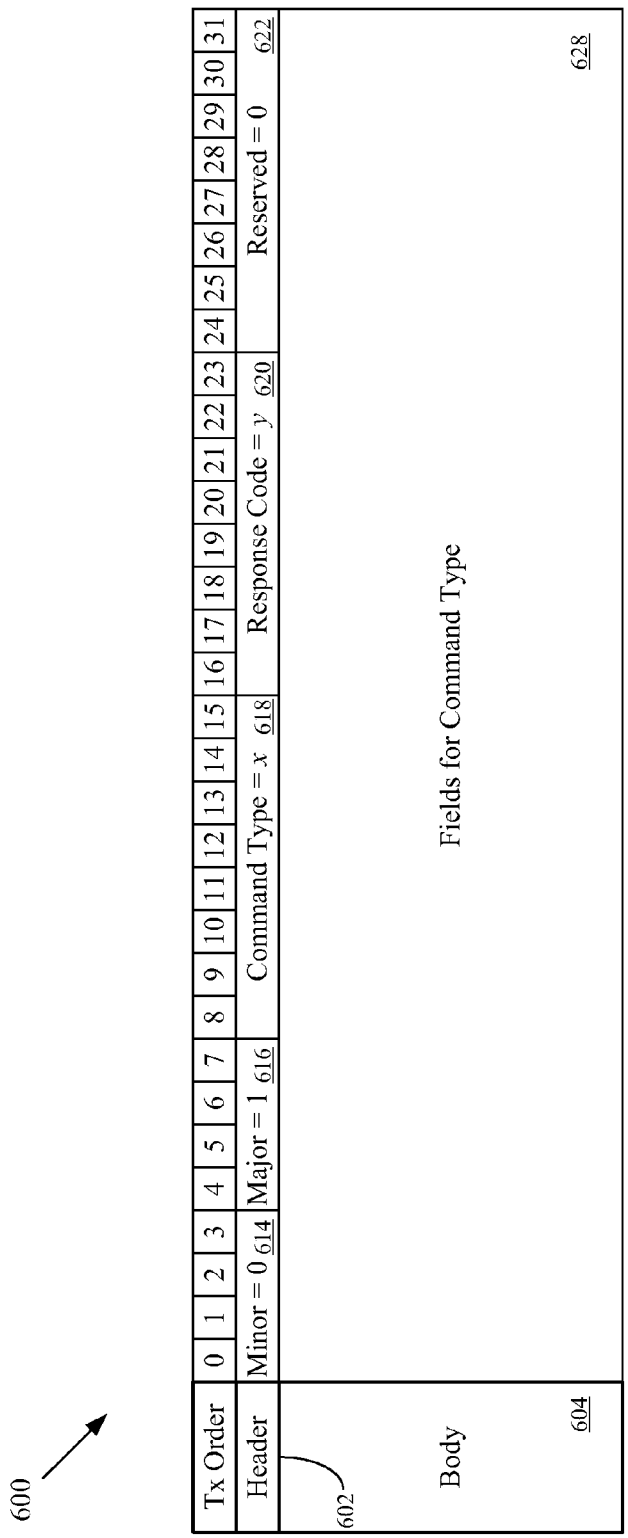
FIG. 6 is an illustration of embodiments of a media control command for an entertainment network.

FIG. 6 is an illustration of embodiments of a control command for a network. The control command may include, for example, a command for control of media data for an entertainment network. In this illustration, the control command 600 may, for example, be carried in the data packet 600 illustrated in FIG. 5, such as in the message body 524. In some embodiments, the control command 600 may be of a fixed length. In one example, the fixed length of the media control command 600 is 40 bytes, but the length of the media control command may be more or less depending on the particular embodiment.

In some embodiments, the media control command 600 may include a header 602 and a body 604, which are illustrated as, for example, a 4-byte header and a 36-byte body in FIG. 6. In some embodiments, a version may be indicated by a major version field 616 and a minor version field 614 in the header 602. In some embodiments, the header may further include a command type field 618 to contain a token to represent the type of command expressed by the command. The possible command types for a control message may vary in different embodiments, with each command type potentially having a different message structure. For example, in some implementations the command types shown in Table 1 may be defined for a media data source agent, which is an agent that transmits media data content.

TABLE 1

Command Types for Media Data Source Agents

| Value | Type | Description |
|---|---|---|
| 0 | Null/Invalid | An undefined message. |
| 1 | Setup Request | Request to setup resources to deliver a piece of media content to a target agent. |
| 2 | Setup Response | Response to a request to setup resources to deliver a piece of media content. |
| 3 | Play Request | Request to begin transmitting media content to a target agent. |
| 4 | Play Response | Response to a request to begin transmitting media content to a target agent. |
| 5 | Pause Request | Request to pause the delivery of a piece of content to a target agent. |
| 6 | Pause Response | Response to a request to pause the delivery of a piece of content. |
| 7 | Teardown Request | Request to teardown resources associated with delivering a piece of media content. |
| 8 | Teardown Response | Response to a request to teardown resources associated with content delivering. |
| 9 | Join Request | Request to join an active session. |
| 10 | Join Response | Response to a request to join an active session. |
| 11 | Leave Request | Request to leave an active session. |
| 12 | Leave Response | Response to a request to leave an active session. |
| 13 | Get Session Info Request | Request for the current information of an active source session. |
| 14 | Get Session Info Response | Response to a request for the current information of an active source session. |
| 15 | Get Rate Request | Request for the nearest transmit rate supported by a target agent. |
| 16 | Get Rate Response | Response to a request for the nearest transmit rate supported by a target agent. |
| 17 | Set Rate Request | Request to set the transmit rate for the active source session. |
| 18 | Set Rate Response | Response to a request to set the transmit rate for the active source session. |
| 19 | Get Absolute Position Request | Request for the absolute position in the media stream for the active source session. |
| 20 | Get Absolute Position Response | Response to a request for the absolute position in the media stream. |
| 21 | Set Absolute Position Request | Request to set the absolute position in the media stream for the active source session. |
| 22 | Set Absolute Position Response | Response to a request to set the absolute position in the media stream. |
| 23 | Set Relative Position Request | Request to set the relative position in the media stream for the active source session. |
| 24 | Set Relative Position Response | Response to a request to set the relative position in the media stream. |
| 25 | Get Duration Request | Request for the duration in seconds of the media content of the active session. |
| 26 | Get Duration Response | Response to a request for the duration in seconds of the media content of the active session. |
| 27 | Get Offset Request | Request for the byte offset in the media stream for the active source session. |
| 28 | Get Offset Response | Response to a request for the byte offset in the media stream for the active source session |
| 29 | Set Offset Request | Request to set the byte offset in the media stream for the active source session. |
| 30 | Set Offset Response | Response to a request to set the byte offset in the media stream. |
| 31 | Get Maximum Targets Request | Request for the maximum number of targets an active session can support. |
| 32 | Get Maximum Targets Response | Response to a request for the maximum number of targets an active session can support. |
| 33 | Get Splice Request | Request for the splice data for a piece of content managed by a target agent |
| 34 | Get Splice Response | Response to a request for the splice data for a piece of content managed by a target agent |
| 35 | Event Notification | Asynchronous event notification for an active source session. |

In some implementations the command types shown in Table 2 may be defined for a media storage agent, which is an agent that receives and stores media data content.

TABLE 2

Command Types for Media Data Storage Agents

| Value | Type | Description |
|---|---|---|
| 0 | Null/Invalid | An undefined message. |
| 1 | Setup Request | Request to setup resources to record a piece of media content at a target agent. |
| 2 | Setup Response | Response to a request to setup resources to record a piece of media content. |
| 3 | Record Request | Request to record incoming media content to a target agent. |
| 4 | Record Response | Response to a request to record incoming media content. |
| 5 | Pause Request | Request to pause recording a piece of content to a target agent. |
| 6 | Pause Response | Response to a request to pause recording a piece of content. |
| 7 | Teardown Request | Request to teardown resources associated with recording a piece of media content. |
| 8 | Teardown Response | Response to a request to teardown resources associated with recording a piece of media content. |
| 9 | Get Session Info Request | Request for the current recording information of an active recording session. |
| 10 | Get Session Info Response | Response to a request for the current recording information of an active recording session. |
| 11 | Set Back-Channel Request | Request to set the network address of the back-channel for an active recording session. |
| 12 | Set Back-Channel Response | Response to a request to set the network address of the back-channel for an active recording session. |
| 13 | Get Reservation Request | Request to get the current space reservation of an active recording session. |
| 14 | Get Reservation Response | Response to a request to get the current space reservation of an active recording session. |
| 15 | Set Reservation Request | Request to set the current space reservation of an active recording session. |
| 16 | Set Reservation Response | Response to a request to set the current space reservation of an active recording session. |
| 17 | Event Notification | Asynchronous event notification for an active recording session. |
| 18 | Unroll Request | Request to unroll content stored as a ring buffer at a target agent. |
| 19 | Unroll Response | Response to a request to unroll content stored as a ring buffer. |
| 20 | Append Request | Request to setup resources to append to an existing piece of content at a target agent. |
| 21 | Append Response | Response to a request to setup resources to append to an existing piece of content. |
| 22 | Delete Request | Request to delete a piece of content managed by a target agent. |
| 23 | Delete Response | Response to a request to delete a piece of content. |
| 24 | Get Splice Request | Request for the splice data for a piece of content managed by a target agent. |
| 25 | Get Splice Response | Response to a request for the splice data for a piece of content managed by a target agent. |
| 26 | Set Splice Request | Request to set the splice data for a piece of content managed by a target agent. |
| 27 | Set Splice Response | Response to a request to set the splice data for a piece of content managed by a target agent. |
| 28 | Get Space Request | Request for the amount of storage space managed by a target agent. |
| 29 | Get Space Response | Response to a request for the amount of total storage space. |

In some implementations the command types shown in Table 3 may be defined for a media display agent, which is an agent that may receive and display media data content.

TABLE 3

Command Types for Media Data Display Agents

| Value | Type | Description |
|---|---|---|
| 0 | Null/Invalid | An undefined message. |
| 1 | Setup Request | Request to setup resources to display a piece of media content at a target agent. |
| 2 | Setup Response | Response to a request to setup resources to display a piece of media content. |
| 3 | Activate Request | Request to activate a target display agent to decode and display incoming media content. |
| 4 | Activate Response | Response to a request to activate a target display agent to decode and display incoming media content. |
| 5 | Pause Request | Request to pause the display of a piece of content to a target device. |
| 6 | Pause Response | Response a request to pause the display of a piece of content. |
| 7 | Teardown Request | Request to teardown resources associated with displaying a piece of media content. |
| 8 | Teardown Response | Response to a request to teardown resources associated with displaying a piece of media content. |
| 9 | Get Session Info Request | Request for the current information of an active display session. |
| 10 | Get Session Info Response | Response to a request for the current information of an active display session. |
| 11 | Set Back-Channel Request | Request to set the network address of the back-channel for an active display session. |
| 12 | Set Back-Channel Response | Response to a request to set the network address of the back-channel for an active display session. |
| 13 | Get Rate Request | Request for the nearest decode rate supported by a target agent for the active display session. |
| 14 | Get Rate Response | Response to a request for the nearest decode rate supported by a target agent for the active display session. |
| 15 | Get Display Manager Request | Request for the identifier of the display manager for a target agent. |
| 16 | Get Display Manager Response | Response to a request for the identifier of the display manager for a target agent. |
| 17 | Event Notification | Asynchronous event notification for an active display session. |

In some embodiments, the header may include a response code field 620. This field, illustrated as, for example, 8 bits, may indicate the return status of a request message. In some embodiments, for any media source command with a command type that is not a response type, the response code field 620 may have the value zero. In some embodiments, if an agent returns a response code that is not defined, the receiver will treat the response as an invalid response. The header may further include one or more reserved fields 622 for further modifications to the network media command protocol.

Finally, the control command 600 may include the fields for the relevant command type 628. In some embodiment, the fields will vary according to the particular command type included in the data packet.

Figure 7:
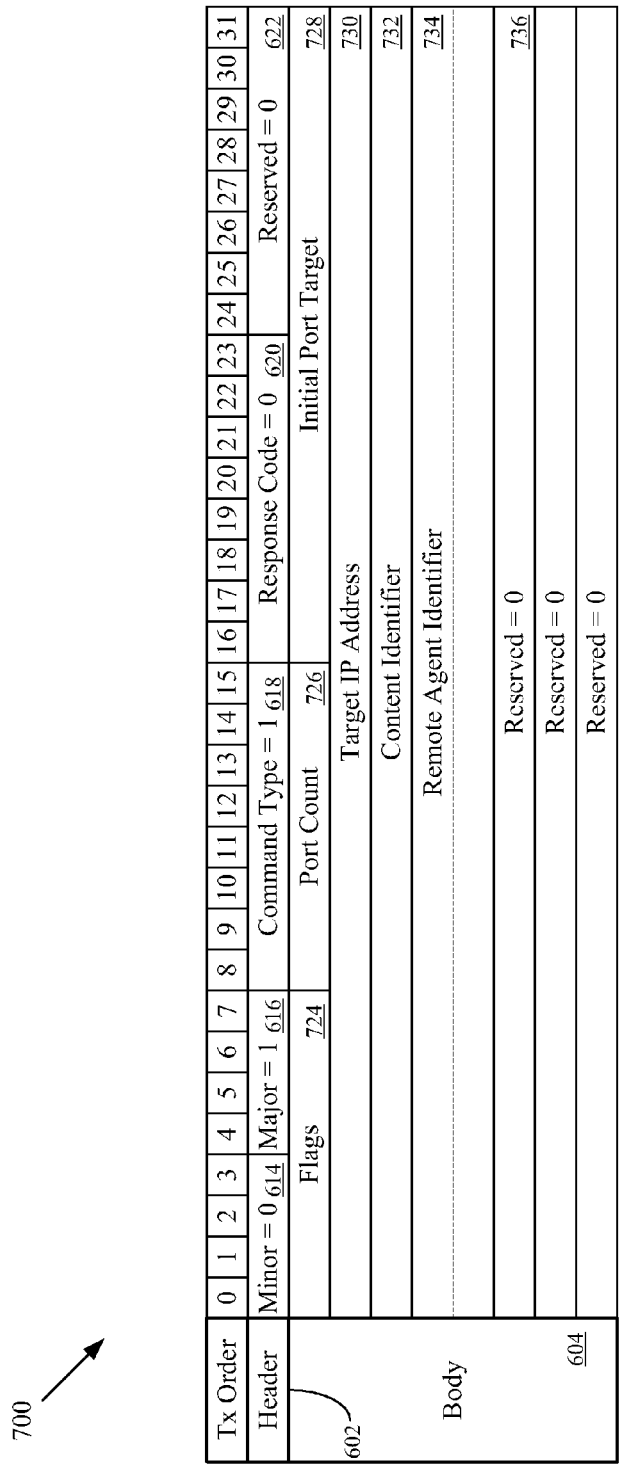
FIG. 7 is an illustration of an example of a media control command to set up resources for a media stream.

FIG. 7 is an illustration of an example of a control command to set up resources for a data stream. In this example, the command 700 includes a header 602 and body 604, with the header including a minor version field 614, a major version field 616, a command type field 618 (here indicated as Command Type 1 for a setup request), a response code field 620 (here indicated as Response Code=0 because a setup request is not a response), and a reserved field 622.

In some embodiments, the body 604 of the command 700 may include: A flags field 724 to represent a bitmap of flags that express information related to other message fields or how to process the request (with, for example, a value of one in a particular bit position indicating a positive value for the associated flag, while a value of 0 indicates a negative value); a port count field 726 to represent the number of ports that can be used for the delivery of a particular piece of content; an initial target port field 728 to represent the initial port in a sequential range of ports at the target device; a target IP address field 730 to represent the target TPv4 address to which the content should be delivered; a content identifier field 732 to represent the identifier of the piece of content that the target agent should deliver; a remote agent identifier field 734 to represents the identifier of the agent that forms the remote endpoint for an active recording session; and one or more reserved fields 736. The fields illustrated in FIG. 7 are provided as one example of a particular command type, and the fields for any other command type will vary as needed to address the command.

Figure 8:
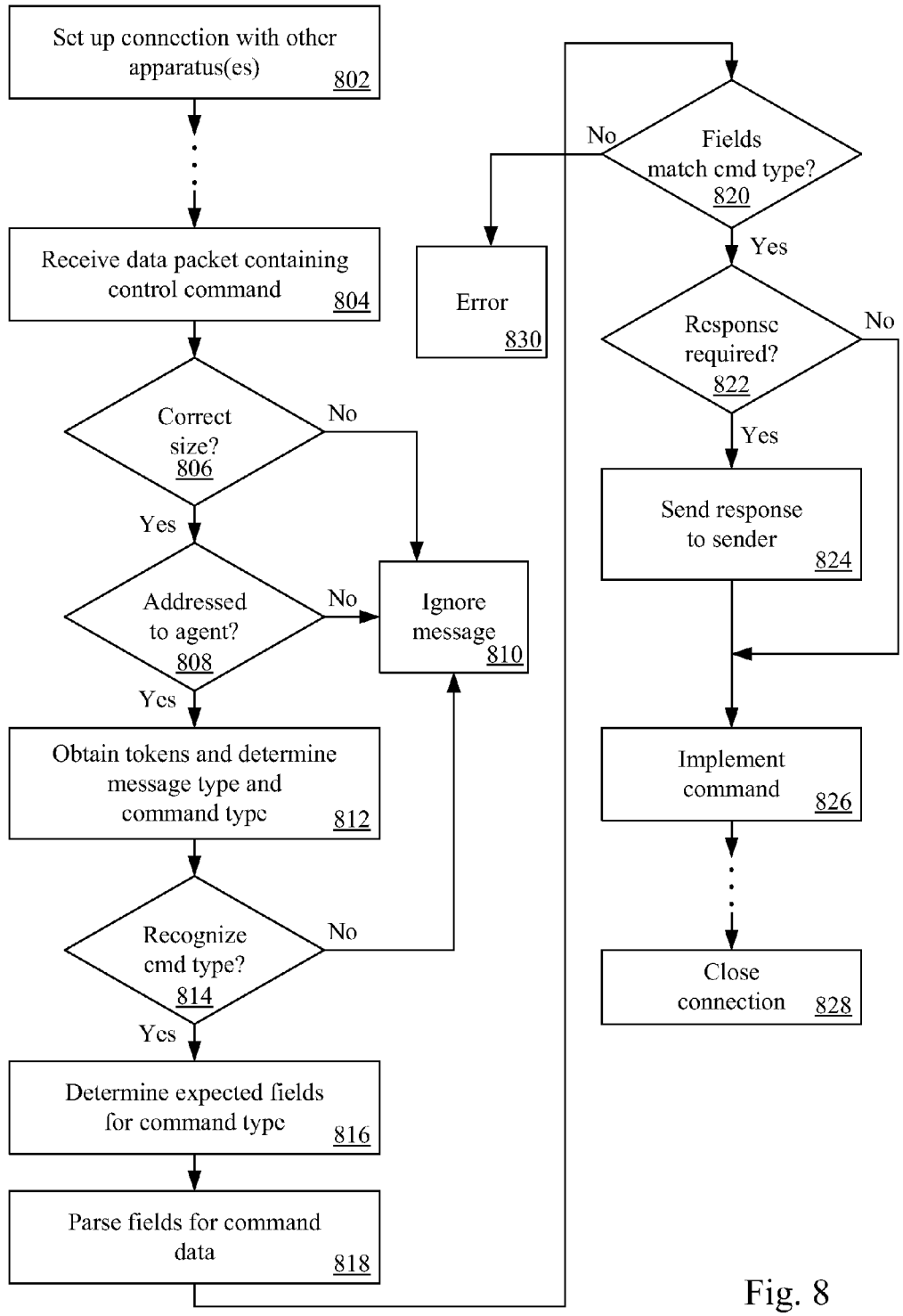
FIG. 8 is a flowchart to illustrate embodiments of a process for media control in an entertainment network.

FIG. 8 is a flowchart to illustrate embodiments of a process for data control in a network. In this illustration, a connection may be set up between an agent of a network device and one or more other agents of another network device or the same network device. In some embodiments, the connection may be used for multiple purposes, and thus is not necessarily established for the purpose of a particular data stream operation. Subsequent to the establishment of a connection, the agent may receive a data packet containing a control command 804.

In some embodiments, there may be a determination whether the data packet is the correct size 806. In some embodiments, the correct size is determined by comparing the size of the data packet to a fixed packet size for the network. In some embodiments, if the data packet is not the correct size, the message is ignored 810. In some embodiments, if the data packet is of a correct size, there is a determination whether the data packet is addressed to the agent 808. If not, the message is ignored 810. If so, tokens are obtained to determine the type of message contained in the message body, and, if the message is a control command, to determine the type of command that is present in the data packet 812. The agent determines whether the agent recognizes the command type 814. In some embodiments, the agent may not recognize the command type if the token is undefined or if the token is for a type of command that is not applicable for the agent 814. If the command is not recognized, the message is ignored 810. If the command is recognized, the expected fields for the command may be determined 816 and the fields of the command are parsed for the command data. If the fields in the command do not match the command type 820, there may be an error 830. (There may be other error conditions that are not illustrated in FIG. 8.) If a response to the command is required 822 the response is sent to the sender of the command 824. The command is then implemented 826. In some embodiments, the completion of the relevant operations may not result in closing the connection because the connection may have multiple uses. When the connection is no longer needed, the connection may be closed 828.

Figure 9:
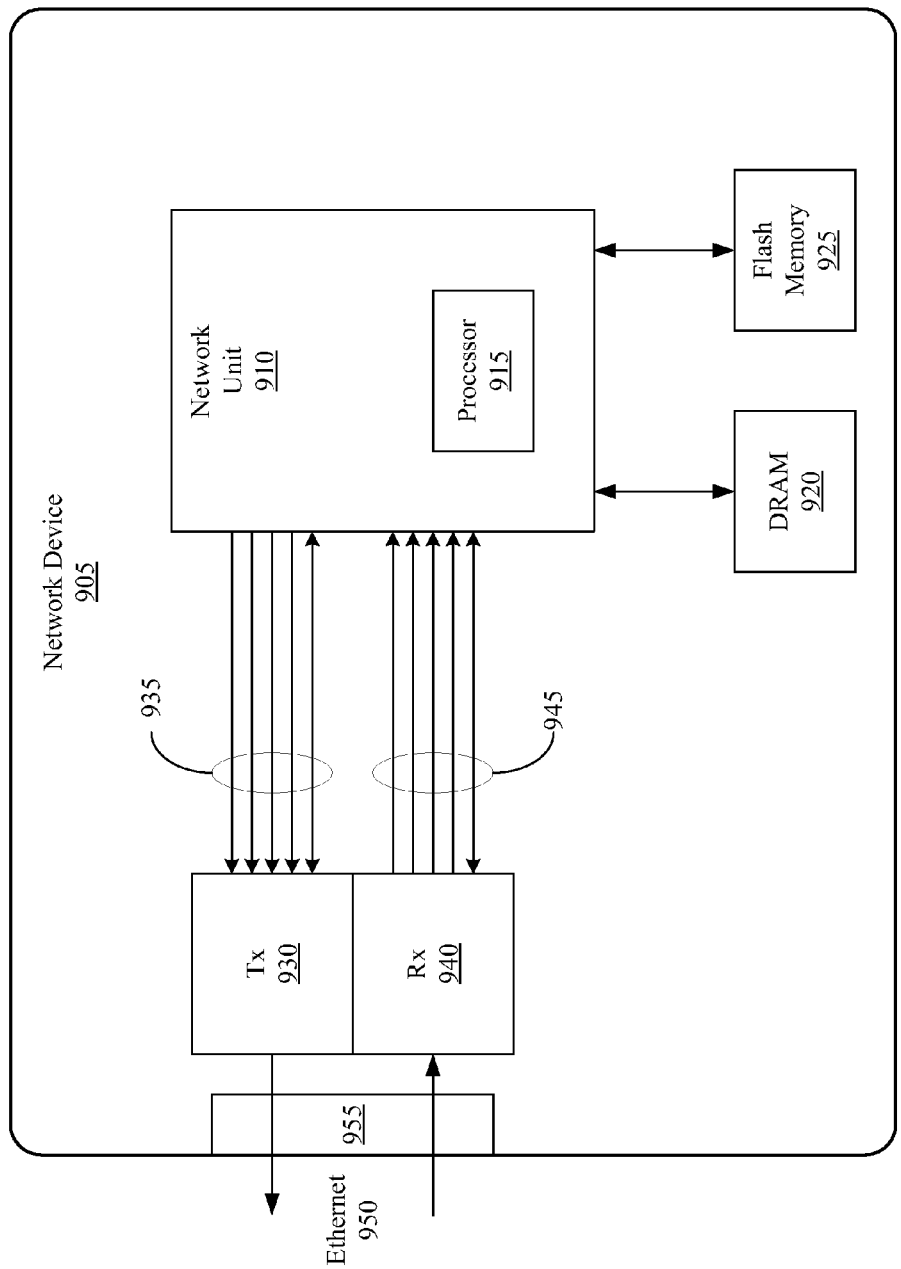
FIG. 9 is an illustration of embodiments of a network device.

FIG. 9 is an illustration of embodiments of a network device. In this illustration, a network device 905 may be any device in a network such as an entertainment network, including, but not limited to, devices illustrated in FIG. 1. For example, the network device may be a television, a set top box, a storage unit, a game console, or other media device. In some embodiments, the network device 905 includes a network unit 910 to provide network functions. The network functions include, but are not limited to, the generation, transfer, storage, and reception of media data streams. The network unit 910 may be implemented as an embedded system. The network unit 910 may be implemented as a single system on a chip (SoC) or as multiple components.

In some embodiments, the network unit 910 includes a processor for the processing of data. The processing of data may include the generation of data streams, the manipulation of data streams for transfer or storage, and the decrypting and decoding of data streams for usage. The network device may also include memory to support network operations, such as DRAM (dynamic random access memory) 920 or other similar memory and flash memory 925 or other nonvolatile memory.

The network device 905 may also include a transmitter 930 and/or a receiver 940 for transmission of data on the network or the reception of data from the network, respectively, via one or more network interfaces 955. The transmitter 930 or receiver 940 may be connected to a wired transmission cable, including, for example, an Ethernet cable 950, or to a wireless unit. A wired transmission cable may also include a coaxial cable, a power line, or any other cable or wire that may be used for data transmission. The transmitter 930 or receiver 940 may be coupled with one or more lines, such as lines 935 for data transmission and lines 945 for data reception, to the network unit 910 for data transfer and control signals. Additional connections may also be present. The network device 905 also may include numerous components for media operation of the device, which are not illustrated here.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described. The illustrated elements or components may also be arranged in different arrangements or orders, including the reordering of any fields or the modification of field sizes.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
   a receiver configured to receive data packets of a fixed packet size, wherein each data packet includes:
   a message type field of a fixed size in a first portion of the data packet, the message type field defining a message type of a message that is contained in the data packet, the message type being one of a plurality of message types, the plurality of message types including a data stream control type, the receiver to determine a message type of each received message based on a message type field of each message, and
   if the message type field of the data packet indicates the message is a data stream control message, the data packet further includes a token for a command associated with streams of data in a second portion of the data packet, the command having a command type, the command type being one of a plurality of defined command types for data stream control messages, the token having a fixed size and format and a numerical value, each numerical value of a set of numerical values representing one of the defined command types, wherein the defined command types include setting up a data stream between the apparatus and one or more destinations, playing the data stream, pausing the data stream, tearing down resources assigned to the data stream, and getting and setting parameters for the data stream;
   a network unit including a message handler, the message handler including a hardware state machine to handle the defined command types, wherein the network unit is configured to determine a command type of each received data stream control message based on a numerical value of a token of the control message and to parse a set of zero or more fields in the received data packet for command data, the network unit being configured to implement the plurality of command types; and
   a transmitter to transmit a stream of data, the transmitter to operate on the stream of data according to commands contained in received data stream control messages.

2. The apparatus of claim 1, wherein each data stream control message has zero or more fields for command data, and wherein a specified size and format for each of the zero or more fields is based on the command type of the data stream control message.

3. The apparatus of claim 1, wherein the apparatus provides a response to each received data stream control message, the response being contained in a data packet of the fixed packet size.

4. The apparatus of claim 3, wherein the response to each received data stream control message is one of a plurality of defined response types for a data stream control message.

5. The apparatus of claim 1, wherein the apparatus is configured to ignore a data packet containing a data stream control message that includes a value that is not included in the set of values for the defined command types.

6. The apparatus of claim 5, wherein the apparatus is configured to ignore a data packet that has a data size that does not match the fixed packet size.

7. The apparatus of claim 1, wherein the apparatus includes one or more agents, each agent being a logical entity on the apparatus, and wherein a first agent of the one or more agents is a destination agent for a first command of a first data stream control message, the network unit to direct the first command to the first agent.

8. The apparatus of claim 1, wherein the apparatus includes one or more of the group consisting of a device with an embedded processor, a device having a system on a chip (SoC), and a handheld device.

9. The apparatus of claim 1, the apparatus comprising a plurality of message handlers including the message handler, the apparatus further comprising a second hardware state machine to vector received messages to the plurality of message handlers based on message types of the received messages.

10. A network comprising:
   a first network device, the first network device configured to generate a token for a command regarding a data stream, the token being contained in a field in a first portion of a first data packet, the first data packet including a message type field in a second portion of the first data packet defining a message type of the first data packet, the message type field containing a value indicating that the data packet is a data stream control message, the token representing a first command type of a plurality of defined command types for data stream control messages in a numerical value, the field having a fixed size and format that is used for each of the plurality of defined command types, the first data packet having a fixed size; and
   a second network device, the second network device configured to determine a message type of each received data packet based upon a message type field of each received data packet, and, upon determining that the first data packet is a data stream control message, the second network device to receive the token for the command, decode the token to determine the first command type represented by the numerical value of the token, and implement the command for the data stream, the second network device comprising:
  a message handler including a hardware state machine configured to handle the defined commands for data stream control messages, and
  a transmitter to transmit the data stream, the transmitter to operate according to the command;
wherein the defined command types include setting up a data stream between the second network device and one or more destinations, playing the data stream, pausing the data stream, tearing down resources assigned to the data stream, and getting and setting parameters for the data stream.

11. The network of claim 10, wherein the second network device is to ignore the command if the data packet does not match the fixed size for data packets.

12. A method for controlling streaming of data in a network comprising:
  generating a command at a first network device to control a data stream in the network, the command including a token to represent a command type of a plurality of command types, the token having a fixed size and format and having a numerical value;
  transmitting the command from the first network device to a second network device in a data packet, the data packet having a fixed size, the data packet including a message type field of a fixed size in a first portion of the data packet, a value of the message type field indicating that the data packet contains a data stream control message, data stream control being one of a plurality of message types;
  receiving the data packet at the second network device and determining based on the message type field that the data packet is a data stream control message;
  decoding the command at the second network device, decoding the command including determining the type of command based on the numerical value of the token and parsing one or more data fields of the data packet, the token being in a second portion of the data packet, wherein a size and a format for each of the data fields is based on the type of command, and handling the command utilizing a message handler having a hardware state machine configured to handle the defined commands, wherein the type of command is one of a plurality of command types, the plurality of command types including setting up a data stream between the apparatus and one or more destinations, playing the data stream, pausing the data stream, tearing down resources assigned to the data stream, and getting and setting parameters for the data stream; and
  controlling the data stream based on the command.

13. The method of claim 12, wherein the network is an entertainment network.

14. The method of claim 12, wherein the command is generated by a first network agent, the first network agent being a logical entity of the first network device.

15. The method of claim 14, wherein the command is received by a second network agent, the second network agent being a logical entity of the second network device, the hardware state machine to direct the command to the second network agent.

16. An article of manufacture comprising:
a non-transitory computer-readable medium including instructions that, when accessed by a processor, cause the processor to perform operations comprising:
receiving a data packet containing a command at a first network device, the command being generated at a second network device to control a data stream by the first network device in a network, the data packet including a message type field of a fixed size in a first portion of the data packet, a value of the message type field indicating that the data packet is a data stream control message, data stream control being one of a plurality of types of messages, the command including a token in a second portion of the data packet to represent a command type of a plurality of defined command types for a data stream control message, the token having a fixed size and format and having numerical value, each numerical value of a set of values representing one of the defined command types;
determining based on the message type field that the data packet is a data stream control message;
decoding the command, decoding the command including determining the type of command based on the numerical value of the token and parsing one or more data fields of the data packet, wherein a size and a format for each of the data fields is based on the type of command, and handling the command with a message handler including a hardware state machine configured to handle the defined commands, wherein the type of command is one of a plurality of command types, the plurality of command types including setting up a data stream between the apparatus and one or more destinations, playing the data stream, pausing the data stream, tearing down resources assigned to the data stream, and getting and setting parameters for the data stream; and
transmitting the data stream according to the received command.

17. A network device comprising:
a network interface, the network interface configured to communicate on the network via a control protocol for data stream control messages, data stream control being one of a plurality of message types for data packets received on the network, the network interface to determine a message type for each received data packet based on a message type field of a fixed size in a first portion of each received data packet, the control protocol for data stream control messages including use of a token received in a second portion of each received data packet to represent a command type of a plurality of command types for data stream control, the token having a fixed size and format and each received data packet being of fixed size;
a message handler to handle commands received in data stream control messages via the network interface, the message handler including a hardware state machine to handle the defined commands; and
one or more agents configured to operate via the network interface, the hardware state machine to direct a first received command to a first agent of the one or more agents;

wherein the handling of the commands includes determining a command type based on a numerical value of a token of each received data stream control message and to parse a set of zero or more fields in the data stream control message for command data, wherein the command type is one of a plurality of command types, the plurality of command types including setting up a data stream between the network device and one or more destinations, playing the data stream, pausing the data stream, tearing down resources assigned to the data stream, and getting and setting parameters for the data stream.

18. The network device of claim 17, wherein an agent of the one or more agents is configured to control another network device remotely via a command sent using the control protocol.

19. The network device of claim 17, wherein the one or more agents may include one or more of media data source agents, media data storage agents, and media data display agents.

20. The network device of claim 19, wherein a media data source agent is to transmit a data stream containing media data content, a media data storage agent is to receive and store media data content, and a media data display agent is to receive and display media data content.

* * * * *